Jan. 29, 1935.  F. W. SEYBOLD  1,989,215

SEGMENTAL GRINDING WHEEL

Filed Aug. 31, 1933

INVENTOR:
FREDERICK W. SEYBOLD

Kwis Hudson & Kent
ATTORNEYS

Patented Jan. 29, 1935

1,989,215

UNITED STATES PATENT OFFICE 1,989,215

SEGMENTAL GRINDING WHEEL

Frederick W. Seybold, Dayton, Ohio, assignor to Harris Seybold Potter Company, Cleveland, Ohio, a corporation of Delaware Original application April 25, 1933, Serial No. 667,841, now Patent 1,979,775. Divided and this application August 31, 1933, Serial No. 687,648

8 Claims. (Cl. 51—209)

This invention relates to improvements in segmental grinding wheels, and is a division of my copending application Serial No. 667,841, filed April 25, 1933.

Amongst the objects of the invention is the provision of a novel and simple multiple segment wheel, the segments of which may be mounted upon or removed from the wheel readily and quickly with or without removing the wheel from the machine in which it is used, the segments being of rugged, simple form, and the parts being so constituted that the tightening of the wedges between the segments serves to draw the latter into position longitudinally as well as radially, thereby requiring no adjustment. Furthermore, the tightening of the wedges puts all of the sectors under stress in a circumferential direction, making each sector absolutely immovable against force tending to turn it upon the wheel.

Figure 1:
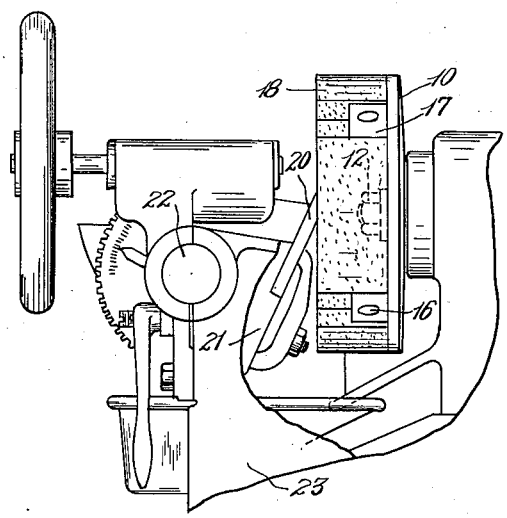

Other objects and features of novelty will appear as I proceed with the description of that form of the invention which, for the purposes of the present application, I have illustrated in the accompanying drawing, in which Figure 1 is a fragmental side elevational view of a portion of a knife grinding machine, with my novel grinding wheel in position therein.

Figures 2, 3:
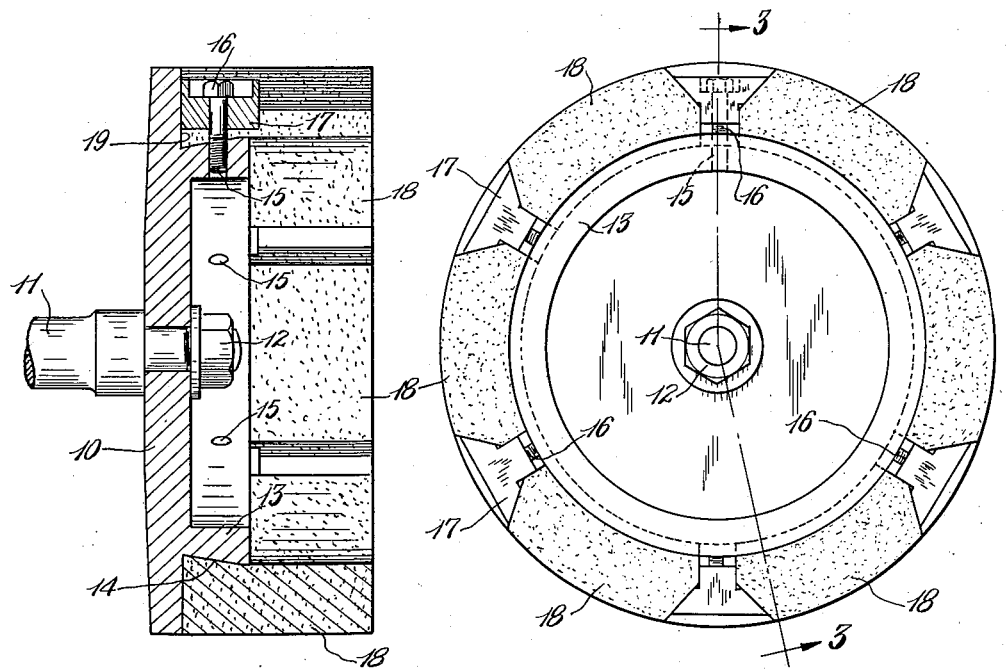

Fig. 2 is a front elevation of the wheel with its segments in place thereon, and Fig. 3 is a cross sectional view of the same taken substantially on the line 3—3 of Fig. 2.

The grinding wheel is of cup shape. It comprises a back member 10 which is centrally perforated to receive the constricted end of a shaft 11 upon which the wheel is mounted and by means of which it is rotated. The wheel is fixed in position by means of a nut 12 threaded onto the reduced extremity of the shaft. The back member 10 is circular, and approximately flat, except that it is provided on its forward side with an annular segment supporting member 13. The outer surface of this supporting member is inclined inwardly toward the back member 10, as shown at 14.

At regular intervals the supporting member 13 is provided with threaded perforations 15, into which are threaded screws 16 that extend through smooth bores in wedges 17. The inclined faces of these wedges engage similarly inclined faces on the side edges of segments 18 of abrading material, that rest at their rear ends upon the annular support 13. The inner surfaces of the segments 18 are enlarged at the rear ends of the segments, that portion of the inner surface of each segment being formed to complement the inclined surface 14 of the annular supporting member 13. Since the parts are circular, these inclined surfaces are in fact conical. The balance of the inner surface of each segment, and all of the outer surface, are preferably cylindrical, although this shape is not entirely essential, as the grinding operation is performed by the forward end of the segment, which is preferably flat.

When the segments 18 and wedges 17 are all in place, the screws 16 may be screwed into the threaded openings 15 to tighten down the wedges, thereby not only drawing the segments radially inward, but also drawing them longitudinally rearward against the surface 19 of the back member 10, and at the same time securing them against movement in a circular or circumferential direction. The wedging of the sectors in a circumferential direction is in fact so effective that the series of sectors become substantially equivalent in rigidity to a one-piece cylindrical grinding element.

It will therefore be observed that the securing means for the sectors is so designed that by manipulation of the screws 16 the sectors are subjected to a wedging action in three different directions simultaneously.

The surfaces 14 and 19 are machined for accuracy, and hence the segments 18 are positioned by the wedges accurately as to circular alignment as well as to bring their grinding faces accurately up to the plane of grinding. The form of the grinding segment, which permits it to be mounted and demounted with facility and accuracy, constitutes an important feature of my invention. Its form is nevertheless simple, permitting manufacture at reasonable cost, and it is not weakened by holes, recesses, or indentations of any kind. The arrangement of the screws 16 in radial positions, with their heads exposed at the periphery of the wheel, makes them readily accessible, and the fact that the segments when mounted or demounted require movement in a radial direction only and are handled exclusively from outside the periphery of the wheel, further facilitates segment replacement. This is of particular importance when the wheel is so located in a machine that it is impossible to remove it without first removing various other parts of the machine. Such a condition is illustrated in Fig. 1 of the drawing, where the knife 20 to be sharpened is mounted in a holder 21 comprising trunnions 22 having bearing in the frame 23 of the machine. Before the grinding wheel can be removed from the machine, it is necessary to remove the work holder 21. The form, arrangement and mounting of the segments, which permits their removal and replacement from the top or sides of the wheel, does away with the necessity for the previous removal of the work holder, and thus permits a material saving in the time required for making replacement.

Variations from the described structure may be employed. Accordingly I desire it to be understood that the scope of the invention is to be regarded as defined exclusively by the appended claims, rather than by the foregoing description or the accompanying illustration.

Having thus described my invention, I claim:

1. A grinding wheel segment for use in cup-shaped grinding wheels, said segment having an outer surface conforming to a segment of a cylinder, the edges of the segment being beveled off below said cylindrical surface for engagement with fastening means, and one end of the segment having an internal enlargement with an internal surface inclined outwardly toward the middle of the segment.

2. A grinding wheel segment for use in cup-shaped grinding wheels, said segment being of the general form of a segment of a cylinder, the side edges of the segment being beveled off externally for engagement with clamping wedges, and one end of the segment having an inwardly projecting portion with an inclined surface for engagement behind an annular supporting member with an inclined surface, whereby the application of wedges to a series of such segments acts to draw them into predetermined position longitudinally as well as radially of the cup-shaped wheel and to fix them rigidly in evenly spaced positions around the wheel.

3. A cup-shaped grinding wheel having a back member adapted to rotate in its own plane, an annular support extending forwardly from said back member and spaced from the periphery of the latter, said annular support having an outer surface which is inclined inwardly toward the back member, a series of grinding segments mounted on the back member and supporting member, said segments having externally beveled side edges and having inwardly inclined surfaces on their inner ends complementary to the inclined surfaces on said annular support, and radially adjustable wedges mounted on the annular support between adjacent segments, said wedges having inclined surfaces complementary to the beveled side edges of the segments.

4. A cup-shaped grinding wheel having a back member adapted to rotate in its own plane, an annular support extending forwardly from said back member and spaced from the periphery of the latter, said annular support having an outer conical surface converging rearwardly, a series of grinding segments mounted on the back member and supporting member, said segments having externally beveled side edges and having internal conical surfaces on their inner ends complementary to the conical surface on said annular support, and radially adjustable wedges mounted on the annular support between adjacent segments, said wedges having inclined surfaces complementary to the beveled side edges of the segments.

5. A grinding wheel segment for use in cup-shaped grinding wheels, said segment having parallel inner and outer end surfaces, having a side surface adjacent to and inclined with respect to the inner end surface, the other side surface of each segment being beveled off at each edge for the reception of wedging blocks positioned between adjacent segments.

6. A cup-shaped grinding wheel having a back member adapted to rotate in its own plane, an annular support extending forwardly from said back member and spaced from the periphery of the latter, said annular support on its outer surface being inclined inwardly toward the back member, a series of grinding segments mounted in the angle between the back member and the outer side of the annular support, each of said segments having externally beveled edges and having an inwardly inclined surface on its inner side complementary to the inclined surface on the annular support, and radially adjustable wedges mounted on the annular support between adjacent segments, said wedges having inclined surfaces complementary to the beveled edges of the segments, the tightening down of the wedges tending to separate adjacent segments in a circumferential direction and tending to draw the segments against said back member and annular support.

7. A cup-shaped grinding wheel having a back member adapted to rotate in its own plane, an annular support extending forwardly from said back member, said annular support having an undercut conical surface on one side thereof, a series of grinding segments mounted in the angle between the back member and the conical surface of the annular support, said segments having inclined side surfaces complementary to and engaging said conical surface, said segments on their opposite sides having beveled edges, wedges fitting the beveled edges of adjacent segments, and means mounted in said annular support for adjusting said wedges radially, whereby the adjacent ends of consecutive segments are wedged apart circumferentially and the segments are drawn tightly against the back member and the conical surface.

8. A cup-shaped grinding wheel having a back member adapted to rotate in its own plane, a series of grinding segments having beveled edges on one side, inner and outer segment gripping means comprising an annular support extending forwardly from said back member and a series of wedges adapted to engage the said beveled edges of the segments, threaded fastenings mounted in the annular support and engaging the wedges between segments for drawing the wedges toward the support, the engaging surfaces between one of said gripping means and the adjacent side of the segments being so inclined as to draw the segments toward the back member, whereby the tightening down of said fastenings produces a wedging action of the segments radially, longitudinally and circumferentially.

FREDERICK W. SEYBOLD.